D. E. HOWATT.
MILKING DEVICE.
APPLICATION FILED MAR. 16, 1910.
961,446.
Patented June 14, 1910.
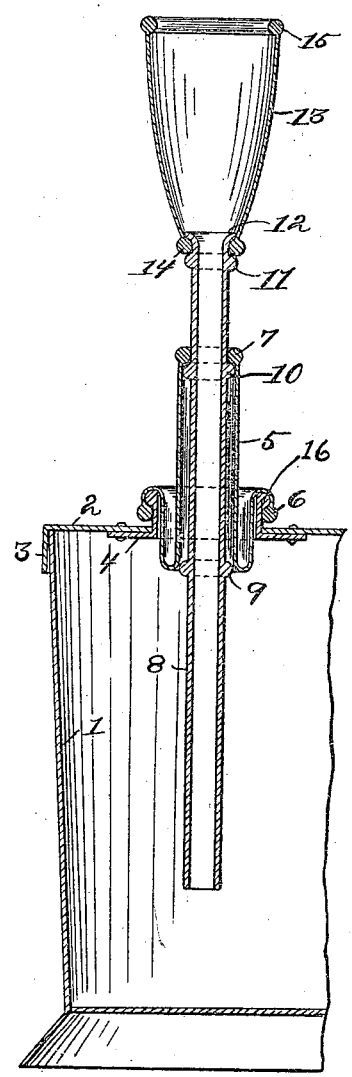
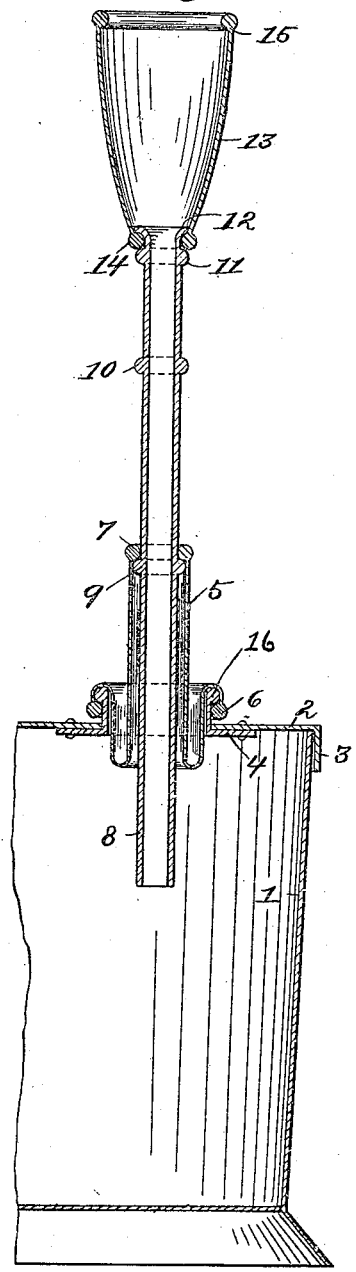
Witnesses.
Inventor.
David E. Howatt
by
J. B. Fay
Attorney.

UNITED STATES PATENT OFFICE.

DAVID E. HOWATT, OF WILLOUGHBY, OHIO.

MILKING DEVICE.

961,446.

Specification of Letters Patent. Patented June 14, 1910.

Application filed March 16, 1910. Serial No. 549,583.

*To all whom it may concern:*

Be it known that I, DAVID E. HOWATT, a citizen of the United States, and a resident of Willoughby, county of Lake, and State of Ohio, have invented a new and useful Improvement in Milking Devices, of which the following is a specification, the principle of the invention being herein explained and the best mode in which I have contemplated applying that principle so as to distinguish it from other inventions.

My invention relates to milking devices and has particular regard for the provision of a device for this purpose which will be extremely sanitary in its operation. In the milking of cows it is customary to conduct the milk into a covered receptacle by a tube projecting through the cover of the receptacle and provided at its end with an enlargement which fits over the teat of the cow's udder. A device of this general nature, however, is not sanitary, for the dirt may creep in around the tube through the opening in the top of the receptacle, and if the tube is allowed to slide in and out through the top of the receptacle during the milking operation, a part of the tube will at one instant be in the air and in the next instant within the receptacle. Obviously this destroys at once any sanitary effect of the device. It is to the obviation of this defect that the present invention relates.

To the accomplishment of these and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawing:—Figure 1 is a broken vertical section of a device embodying my invention; Fig. 2 is a similar section illustrating the parts in a different adjustable position.

The device comprises in the first place a receptacle 1 provided with a top 2 which has a depending lateral flange 3 which snugly fits the sides of the receptacle and hence makes a tight closure between the top and the side of the receptacle. It is contemplated that a single receptacle will be provided with two tubes which, however, will be duplicates of each other, and hence only one is shown. The top of the receptacle which will be formed of any suitable material, preferably of tin, is provided with a plurality of openings, the number of these openings being determined by the number of tubes that it is desired to use with the receptacle. In each of these openings in the top is secured a flanged eyelet 4 provided at its top with an enlarged ring 16. A tube 8 is used for conducting the milk from the udder into the receptacle, and this tube may be formed of any material, although it will preferably be a rigid tube formed of aluminum. Intermediate its ends the tube 8 is exteriorly formed with two spaced rings 9 and 10, which may be either cast integrally with the tube or soldered to the tube after the formation of the latter. At its top the tube is formed with a flared end 12, and immediately below such flared end it is provided with a ring 11 similar to the rings 9 and 10. A flexible enlarged portion 13, which will preferably be constructed of rubber, is then secured to the upper end of the tube. The portion 13 may be very conveniently secured to the tube 8 by forming portion 13 at its bottom with an elastic ring 14 which is stretched over the flared mouth 12 of the tube, and is then securely held in place between such flared mouth and the ring 11. At its upper end, the portion 13 is formed with an elastic ring 15 which will serve to hold it securely to the teat. For the purpose of movably securing the tube 8 to the top 2 of the receptacle, I employ a flexible, telescoping shield 5 which may be of any suitable flexible material, but which for practical purposes will preferably be formed of rubber. This shield is wider at the bottom than at the top and is formed at its bottom with an elastic ring 6 which is stretched over the eyelet 4 and is then securely held in place by the ring 16. The upper end of the shield 5 is formed with a similar elastic ring 7 which fits over and is held in place by either of the rings 9 or 10 on the tube, as desired. In Fig. 1 I have shown the shield as held to the tube by the ring 10, while in Fig. 2 I have shown it as held by the ring 9.

Preliminary to the milking operation, the tube, having been thoroughly sterilized, is secured to the receptacle by inserting it through the opening in the receptacle top and securing the upper end of the shield in place on the tube. Owing to the varying heights of cows it is necessary that some means be provided so that the device may be adjusted to meet these variations. This I have accomplished in a very simple manner by the two spaced rings formed on the tube. If, then, the device is to be used with a high cow the shield will be secured to the lower of the two rings, and if it is to be used with a lower cow it will be secured to the upper of the two rings. The device is thus quickly and easily adjustable within a wide range of heights. After the device has been thus assembled in the desired manner, it is ready for operation after simply placing the enlargement at the top of the tube over the cow's teat. During the milking operation, then, there is no sliding movement of the tube relatively to the shield, but during the reciprocal motion of the tube the shield remains fixedly secured to the tube at its point of attachment, and the motion is taken up by the telescopic action of the flexible shield. Furthermore, if it is desired, or becomes necessary, to move the tube at an angle, this is readily allowed by the width of the eyelet in the top of the receptacle and by the freedom of motion of the flexible shield.

The highly important advantages attainable by the use of my device should be obvious. After the various parts of the device are assembled and the milking operation has begun, no part which is ever exposed to the air subsequently enters into the receptacle into which the milk is being conducted. The flexible shield allows complete freedom of motion in both a vertical and an angular direction, for it itself takes up all motion of the tube relatively to the top of the receptacle so that the tube does not slide relatively to the opening through which it projects, that is, the top of the flexible shield. Consequently it is impossible for any dirt or germs to creep in around the tube and into the milk. This is equally true of all of the joints in the completed device from the top of the enlarged portion to the attachment of the shield to the receptacle top. At the same time the device consists of only a very few parts, each of which is extremely simple in itself. Owing to the extreme simplicity of the complete device, after the milking operation is completed it may be disassembled and every part thoroughly sterilized before a new operation is begun.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A milking device, comprising a receptacle provided with an opening, a tube directed into said opening, and means closing said opening around said tube, said means being secured to the tube in fixed position but allowing movement of the tube relatively to the receptacle.

2. A milking device, comprising a receptacle provided with an opening, a tube directed into said opening, and means closing said opening around said tube, said means being secured to the tube and to the receptacle in fixed positions but allowing movement of the tube relatively to the receptacle.

3. A milking device, comprising a receptacle provided with an opening, a tube directed into said opening, and flexible means closing said opening around said tube, said means being secured to the tube and to the receptacle in fixed positions.

4. A milking device, comprising a receptacle provided with an opening, a tube directed into said opening, and a flexible shield fixedly secured around said opening and fixedly secured to said tube.

5. A milking device, comprising a receptacle provided with an opening, a tube directed into said opening, a flexible shield fixedly secured around said opening and fixedly secured to said tube, and means for adjusting the point of attachment of the shield to the tube.

6. A milking device, comprising a receptacle provided with an opening, a tube directed into said opening, a removable flexible shield fixedly secured around said opening and fixedly secured to said tube, and means for adjusting the point of attachment of the shield to the tube.

7. A milking device, comprising a receptacle provided with an opening, a tube directed into said opening, a removable flexible shield fixedly secured around said opening and fixedly secured to said tube, means for adjusting the point of attachment of the shield to the tube, and a flexible member removably secured to the upper end of said tube.

8. A milking device, comprising a receptacle provided with an opening and with a shoulder surrounding said opening, a tube directed into said opening and provided with a plurality of peripheral shoulders, and a flexible shield provided at each end with an elastic ring, one of said rings engaging the shoulder around said opening and the other engaging a selected one of the shoulders on said tube.

9. A milking device, comprising a receptacle provided with an opening, a tube directed into said opening and provided at its upper end with two peripheral shoulders, a flexible member provided with an elastic ring held between said shoulders, and a flexible shield fixedly secured around said opening and fixedly secured to said tube.

Signed by me this 14th day of March, 1910.

DAVID E. HOWATT.

Attested by—
ROBERT M. SEE,
D. T. DAVIES.